United States Patent
Rhee et al.

(10) Patent No.: US 9,904,780 B2
(45) Date of Patent: Feb. 27, 2018

(54) TRANSPARENT DETECTION AND EXTRACTION OF RETURN-ORIENTED-PROGRAMMING ATTACKS

(71) Applicant: NEC Laboratories America, Inc., Princeton, NJ (US)

(72) Inventors: Junghwan Rhee, Princeton, NJ (US); Yangchun Fu, Dallas, TX (US); Zhenyu Wu, Plainsboro, NJ (US); Hui Zhang, Princeton Junction, NJ (US); Zhichun Li, Princeton, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 103 days.

(21) Appl. No.: 14/812,634

(22) Filed: Jul. 29, 2015

(65) Prior Publication Data
US 2016/0034687 A1 Feb. 4, 2016

Related U.S. Application Data

(60) Provisional application No. 62/031,204, filed on Jul. 31, 2014.

(51) Int. Cl.
*G06F 21/52* (2013.01)
*G06F 21/60* (2013.01)
*G06F 21/55* (2013.01)

(52) U.S. Cl.
CPC ............ *G06F 21/52* (2013.01); *G06F 21/554* (2013.01); *G06F 21/60* (2013.01); *G06F 2221/033* (2013.01)

(58) Field of Classification Search
CPC ....................................................... G06F 21/52
USPC ................................................................ 726/23
See application file for complete search history.

(56) References Cited

U.S. PATENT DOCUMENTS

| | | | |
|---|---|---|---|
| 9,594,912 B1 * | 3/2017 | Thioux | G06F 21/577 726/1 |
| 2012/0304172 A1 * | 11/2012 | Greifeneder | G06F 9/45504 718/1 |
| 2013/0047255 A1 * | 2/2013 | Dalcher | H04L 63/20 726/23 |
| 2013/0185792 A1 * | 7/2013 | Balakrishnan | G06F 21/54 726/22 |
| 2014/0123286 A1 * | 5/2014 | Fischer | G06F 21/566 726/23 |
| 2014/0229717 A1 * | 8/2014 | Venkat | G06F 21/52 712/225 |

(Continued)

*Primary Examiner* — Haresh N Patel
(74) *Attorney, Agent, or Firm* — Joseph Kolodka

(57) ABSTRACT

Systems and methods for detection and prevention of Return-Oriented-Programming (ROP) attacks in one or more applications, including an attack detection device and a stack inspection device for performing stack inspection to detect ROP gadgets in a stack. The stack inspection includes stack walking from a stack frame at a top of the stack toward a bottom of the stack to detect one or more failure conditions, determining whether a valid stack frame and return code address is present; and determining a failure condition type if no valid stack frame and return code is present, with Type III failure conditions indicating an ROP attack. The ROP attack is contained using a containment device, and the ROP gadgets detected in the stack during the ROP attack are analyzed using an attack analysis device.

16 Claims, 8 Drawing Sheets

(56) References Cited

U.S. PATENT DOCUMENTS

| | | | |
|---|---|---|---|
| 2015/0095617 A1* | 4/2015 | Shanbhogue | G06F 9/30054 712/208 |
| 2015/0215335 A1* | 7/2015 | Giuliani | H04L 63/1441 726/23 |
| 2015/0278516 A1* | 10/2015 | Caprioli | G06F 9/30145 726/22 |
| 2015/0339480 A1* | 11/2015 | Lutas | G06F 21/56 726/22 |
| 2016/0034687 A1* | 2/2016 | Rhee | G06F 21/52 726/23 |
| 2016/0357958 A1* | 12/2016 | Guidry | G06F 21/53 726/22 |

\* cited by examiner

shows an exemplary processing system to which

TRANSPARENT DETECTION AND EXTRACTION OF RETURN-ORIENTED-PROGRAMMING ATTACKS

RELATED APPLICATION INFORMATION

This application claims priority to provisional application No. 62/031,204 filed Jul. 31, 2014, the contents of which are incorporated herein by reference.

BACKGROUND OF THE INVENTION

Technical Field

The present invention relates generally to detection and prevention of Return-oriented-programming (ROP) attacks, and more particularly, to transparent detection, extraction, and prevention of ROP attacks based on code and/or stack inconsistency.

Description of the Related Art

Return-oriented programming (ROP) is one of most sophisticated and powerful modern attack techniques, and can bypass state-of-the-art security defense mechanisms (e.g., data execution prevention (DEP), address space layout randomization (ASLR), etc.). This technique has gained popularity in modern attacks and exploits due to its strength. Several approaches have been proposed to detect the attacks, but conventional approaches can only detect attacks after they occur. Moreover, most approaches require the understanding of the program to be protected such as the analysis of program control flow (e.g., disassembly of binary code or source code) and the instrumentation of security-enhancing code into the program. However, such requirements may not be always available in production environments where programs are deployed without supporting information (e.g., source code information).

A conventional approach to detect ROP attacks (e.g., kBouncer) detects ROP attacks by using Indirect Branch Tracing, which is offered by hardware features of commodity processors (e.g., Last Branch Recording in Intel CPUs). These CPUs store the last branches in specific registers. For example, kBouncer records return instructions and checks whether they are preceded by call instructions. Another conventional approach to detect ROP attacks (e.g., ROPPecker) detects ROP attacks by identifying the existence of a long sequence of ROP gadgets chained together, which is discovered by Last Branch Recording of modern CPUs. This approach requires a pre-processing of ROP gadgets included in the program binary and related libraries. Using this information and the return addresses in the last branches, this approach determines the existence of a long chain. However, both of these conventional approaches can only detect ROP attacks after ROP gadgets are already executed.

BRIEF SUMMARY OF THE INVENTION

A computer implemented method for performing stack inspection, using a stack inspection device, to detect one or more ROP gadgets in a stack. The stack inspection further includes stack walking from a stack frame at a top of the stack toward a bottom of the stack to detect one or more failure conditions, determining whether a valid stack frame and return code address is present, and determining a failure condition type if no valid stack frame and return code is present, with Type III failure conditions indicate an ROP attack. The ROP attack is contained using a containment device, and the one or more ROP gadgets detected in the stack during the ROP attack are analyzed using an attack analysis device.

A system for detection and prevention of Return-Oriented-Programming (ROP) attacks in one or more applications, including an attack detection device, the attack detection device including a stack inspection device for performing stack inspection to detect one or more ROP gadgets in a stack. The stack inspection device further includes a stack walking device for stack walking from a stack frame at a top of the stack toward a bottom of the stack to detect one or more failure conditions, and an address validity determination device for determining whether a valid stack frame and return code address is present and determining a failure condition type, with Type III failure conditions indicating an ROP attack. A containment device contains the ROP attack, and an attack analysis device analyzes the one or more ROP gadgets detected in the stack during the ROP attack.

A computer-readable storage medium including a computer-readable program, wherein the computer-readable program when executed on a computer causes the computer to perform the steps of performing stack inspection, using a stack inspection device, to detect one or more ROP gadgets in a stack. The stack inspection further includes stack walking from a stack frame at a top of the stack toward a bottom of the stack to detect one or more failure conditions, determining whether a valid stack frame and return code address is present, and determining a failure condition type if no valid stack frame and return code is present, with Type III failure conditions indicate an ROP attack. The ROP attack is contained using a containment device, and the one or more ROP gadgets detected in the stack during the ROP attack are analyzed using an attack analysis device.

These and other advantages of the invention will be apparent to those of ordinary skill in the art by reference to the following detailed description and the accompanying drawings.

DETAILED DESCRIPTION

Figure 1:
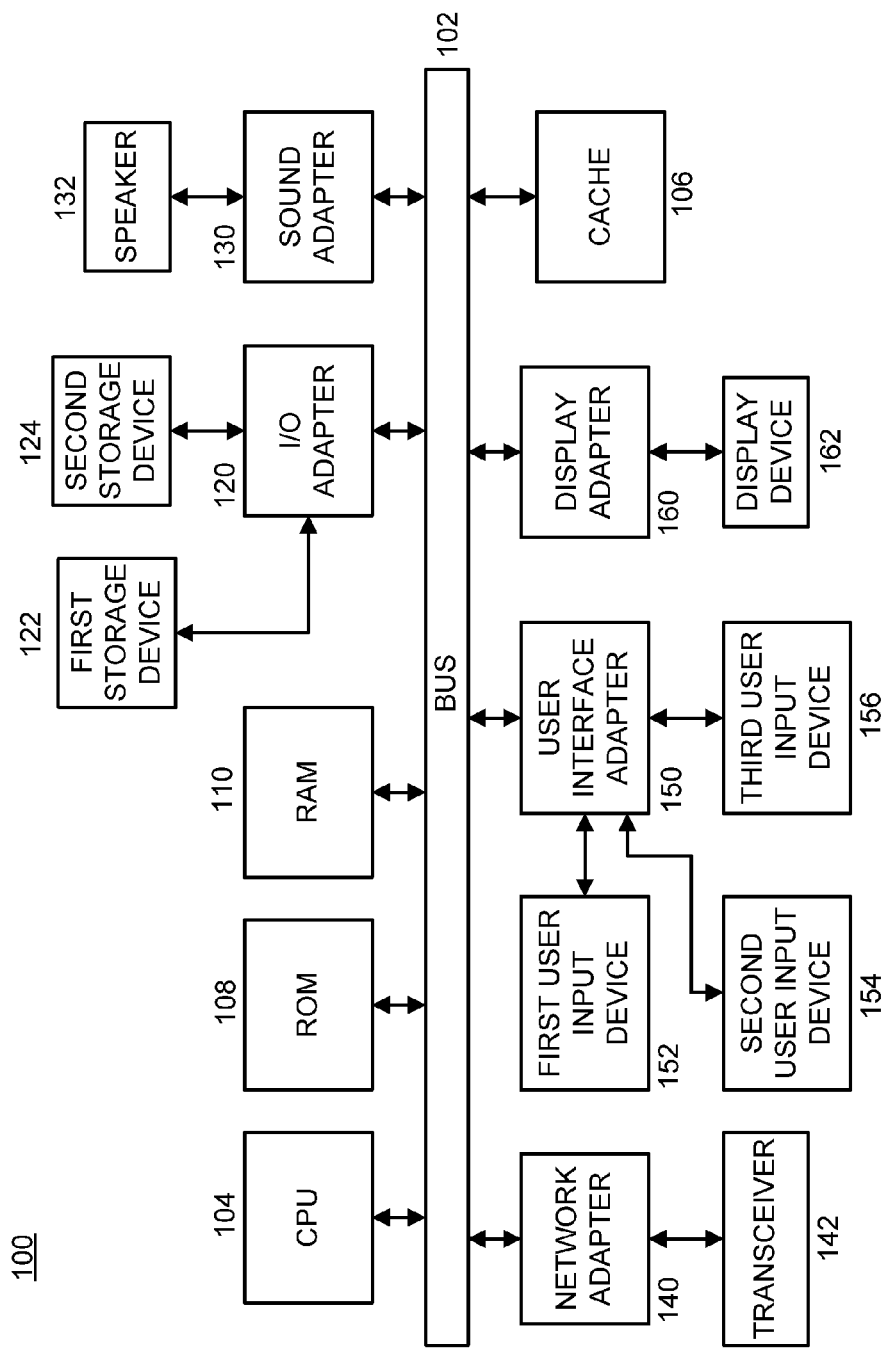
FIG. 1 shows an exemplary processing system to which the present principles may be applied, in accordance with an embodiment of the present principles.

The present invention is directed to detection, extraction, and prevention of Return-Oriented-Programming (ROP) attacks, in accordance with various embodiments of the present principles. In an embodiment, consistency between program code and stack status may be employed according to the present principles. For example, a variation of stack walking (e.g., stack unwinding) may be performed to detect a sequence of function return addresses of active stack frames from a stack to detect any inconsistencies according to the present principles.

In an embodiment, the present principles may detect ROP gadgets in a stack before the gadgets are executed, or before a first system call originated from the gadget executed (at the latest) by employing program binaries without any analysis of its source code or disassembly. In addition to this proactive mitigation of ROP attacks, the present principles may systematically extract the full sequence of ROP gadgets that the attacker injected (e.g., including both executed and non-executed gadgets) using, for example, an offline forensic analysis.

In a particularly useful embodiment, the present principles may detect ROP attacks before they execute once they are deployed in the stack in the earliest or before the execution of the first OS event from the gadget in the latest. Most of gadgets are intended to trigger system services such as system calls to generate major impact such as forking another program, changing its privilege, or writing into a file. The present principles may mitigate ROP attacks from incurring such impact beyond the boundary of the program towards the operating system or other programs through OS events.

In an embodiment, the present principles advantageously exploit that there must be consistency between code and the stack status to get the program executed correctly. This consistency is conventionally not rigorously checked during the execution of an application/program, thus allowing ROP gadgets to be executed without being stopped (e.g., at least temporarily in the CPU states). The present principles may employ specific exception handler table information, which is a type of information which may represent such consistency embedded in most native program binaries via a variant of stack walking technique to efficiently scan a program stack and validate the consistency at runtime.

Stack walking (e.g., stack unrolling) is a technique used traditionally in the debugging, exception handling, and more recently in modern runtime optimization techniques (e.g., stackwalk for memory management). This technique scans the stack and discovers a sequence of return code addresses by advancing a stack pointer through varying sizes of stack frames. In an embodiment, the present principles employ a variant of this technique for a security domain to efficiently check the consistency of the stack and proactively determine whether ROP gadgets are deployed in the stack. Since the detection may be based on the whole of the stack frames in the stack (e.g., potentially in a deep position), the system and method according to the present principles may not only detect an attack that is currently occurring or that has occurred in the past, but also may detect attacks to be executed in the future according to various embodiments.

In an embodiment, the present principles detect ROP gadgets, and prevent the gadgets from a successful ROP attack in a stack before their execution (or before a first OS event triggered from a gadget). It is noted that although the present principles are described in terms of ROP gadgets, any type of manipulation of a return address in a stack may be detected and prevented according to various embodiments. The present principles also provide a systematic forensic capability to discover a full sequence of ROP gadgets deployed in a stack (e.g., to be executed in the future and/or executed in the past).

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 8:
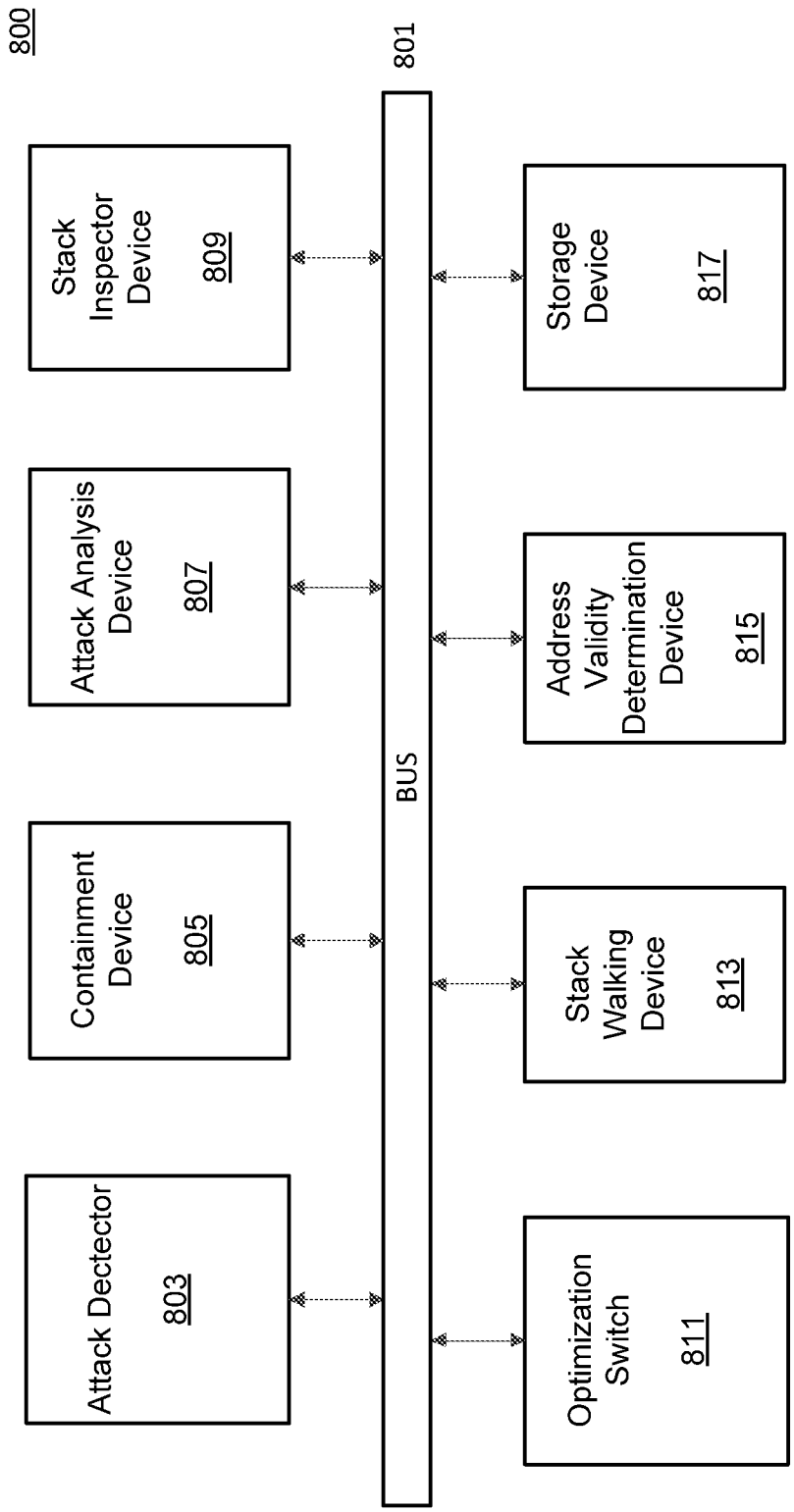
FIG. 8 shows a block/flow diagram of an exemplary system for detection, extraction, and prevention of Return-Oriented-Programming (ROP) attacks, in accordance with an embodiment of the present principles.

Moreover, it is to be appreciated that systems 100 and 800 described below with respect to FIGS. 1 and 8 are systems for implementing respective embodiments of the present principles. Part or all of processing system 100 may be implemented in one or more of the elements of system 800 with respect to FIG. 8.

Further, it is to be appreciated that processing system 100 may perform at least part of the method described herein including, for example, at least part of methods 200, 300, 400, 500, 600, and 700 of FIGS. 2, 3, 4, 5, 6, and 7, respectively. Similarly, part or all of system 800 of FIG. 8 may be used to perform at least part of methods 200, 300, 400, 500, 600, and 700 of FIGS. 2, 3, 4, 5, 6, and 7, respectively.

Figure 2:
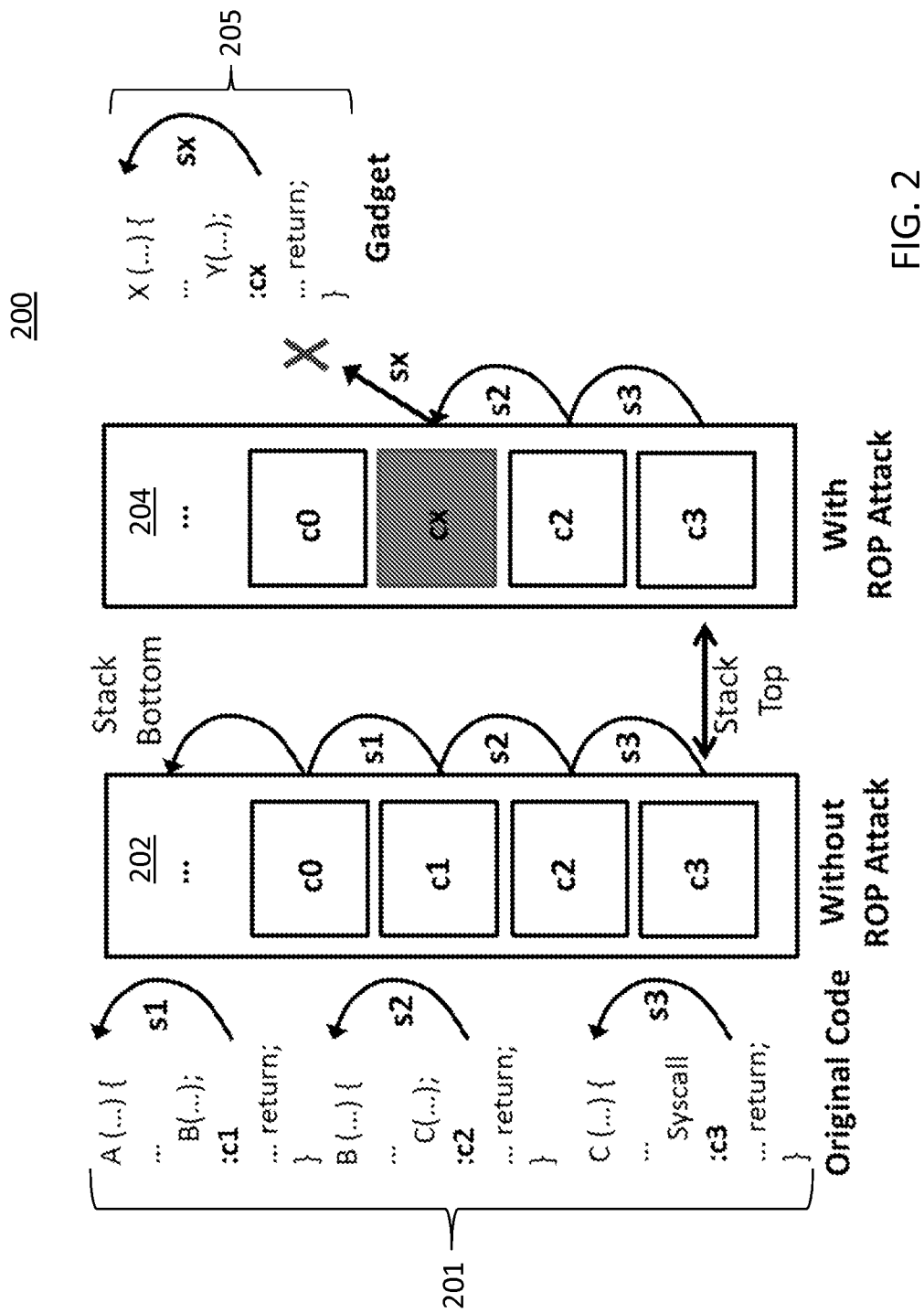
FIG. 2 shows an exemplary diagram of stack walking with and without a Return-Oriented Programming (ROP) attack, in accordance with an embodiment of the present principles.

Referring now to FIG. 2, an exemplary diagram of stack walking with and without an ROP attack 200 is illustratively depicted in accordance with an embodiment of the present principles. In an embodiment, upon receiving input of, for example, a pair of a program counter and a stack pointer, stack walking may scan the stack 202 starting from the stack top, and moving towards the stack bottom. A stack pointer may be iteratively advanced for the size of each stack frame (e.g., s3, s2, s1, etc.), and may find a return code address (e.g., c3, c2, c1, c0) in each step (e.g., iterative advance). The size of each stack frame (e.g., s3, s2, s1, etc.) at a given code address may be found from unwinding information, which exists in the program binary, and which will be described in further detail herein below. An example of pseudocode for the stack walking without an ROP attack (e.g., original code) is shown in block 201.

In block 204, an illustration of stack walking with an ROP attack present is shown in accordance with the present principles. In an embodiment, when an ROP attack occurs, the sequence of ROP gadgets may be executed, and this control flow is unusual in the original application/program. By using an unusual portion of function code (e.g., return or jump into the middle of a function ending with a return), the distance between return addresses is no longer the distance of a valid function call. Therefore, stack walking may be unlikely to find a proper return address of the next stack frame. For example, the gadget, which may include the code in block 205, may cause the return address (cx) to give the stack distance (sx) and at that position, an invalid return address is found (e.g., because of the ROP attack).

In various embodiments, ROP gadgets deployed in a stack may be detected before an ROP attack occurs because the present principles may be employed to inspect all stack frames in a stack. Furthermore, in addition to the mitigation of attacks before they occur, the present principles may automatically extract an attack sequence of gadgets that the attack may have injected into the stack, which provides systematic capability of forensic analysis in various embodiments. These embodiments will be described in further detail herein below.

Figure 3:
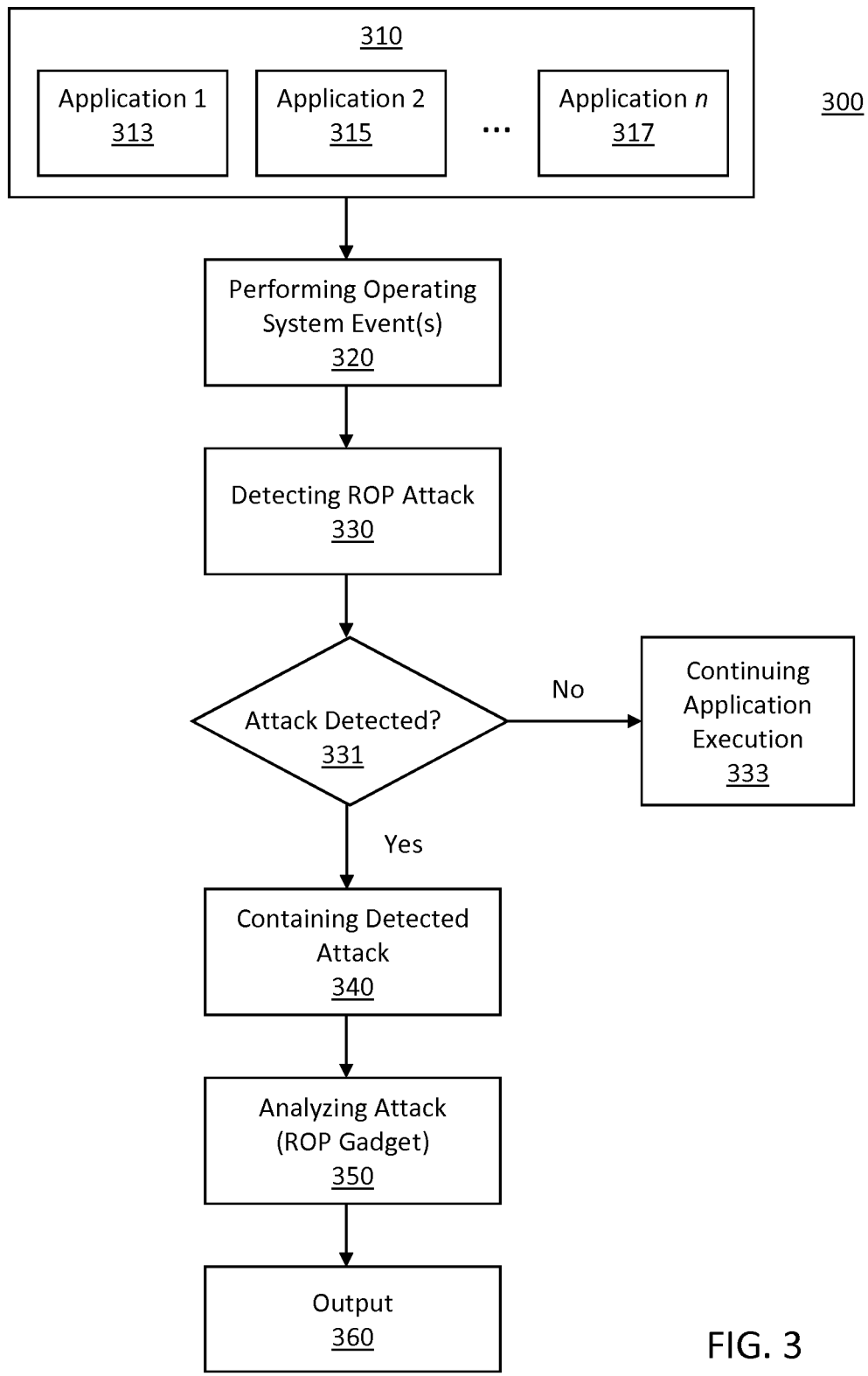
FIG. 3 shows a high-level block/flow diagram of an exemplary method for detection, extraction, and prevention of Return-Oriented-Programming (ROP) attacks, in accordance with an embodiment of the present principles.

Referring now to FIG. 3, a high-level block/flow diagram of an exemplary method for detection, extraction, and prevention of Return-Oriented-Programming (ROP) attacks 300 is illustratively depicted in accordance with an embodiment of the present principles. In an embodiment, the system and method according to the present principles may interact with an operating system kernel 310, which may include a plurality of applications 313, 315, and 317.

In block 320, an operating system event (e.g., system call, interrupt, context switch, etc.) may be performed, and the performance of the operating system event in block 320 triggers the system and method according to the present principles to detect whether an ROP attack is occurring in one or more applications (e.g., 313, 315, and 317) in block 330. In various embodiments, the detection in block 330 may be performed transparently (e.g., without any instrumentation or modification of application software). In block 331, if an attack is detected, the attack may be contained in block 340, and the ROP gadget may be analyzed in block 350 before generating an output in block 360. In block 331, if no attack is detected, then application execution may continue in block 333.

In an embodiment, the present principles employ three main components. The first component may be an ROP attack detection device, which detects ROP attacks in block 330. The second component may be a containment device, which may contain a detected attack in block 340 by suspending execution of the process (e.g., application/program) under attack to stop the progress of the attack and to block any impact to the operating system or other programs. The third component may be an attack analysis device, which may analyze the suspended process states and discover the sequence of ROP gadgets (e.g., that may be reused pieces of original code chained to be used for an ROP attack) in block 350. These components will be described in further detail herein below.

Figure 4:
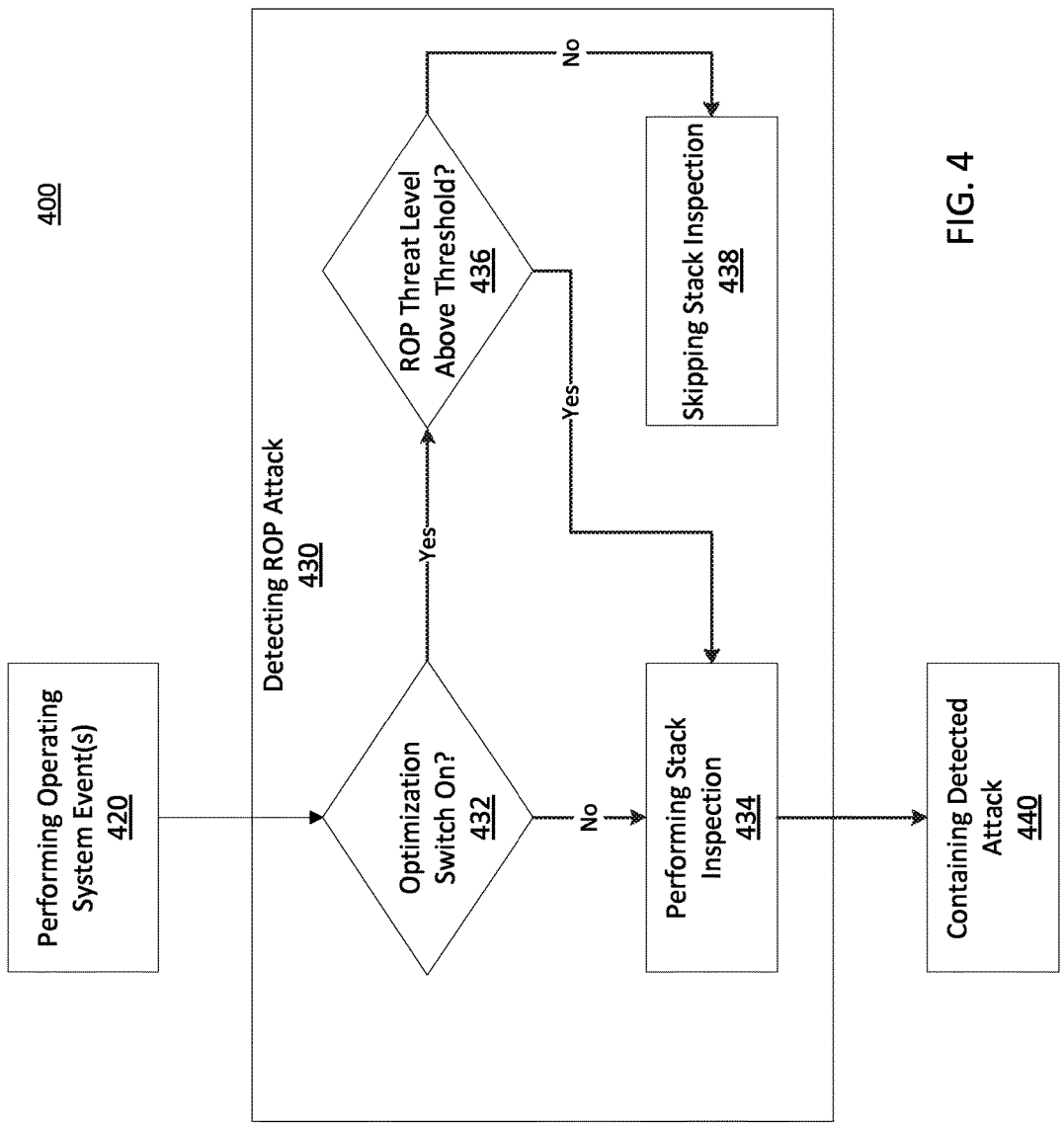
FIG. 4 shows a block/flow diagram of an exemplary method for Return-Oriented-Programming (ROP) attack detection, in accordance with an embodiment of the present principles.

Referring now to FIG. 4, a block/flow diagram of an exemplary method for Return-Oriented-Programming (ROP) attack detection 400 is illustratively depicted in accordance with an embodiment of the present principles. In block 420, one or more operating system events may be performed, which may trigger ROP attack detection in block 430 to determine whether an ROP attack is present. In block 432, it may be determined whether an optimization switch is turned on. The optimization switch may be employed to apply optimization to system performance during the attack detection in some embodiments. As this optimization may be related to a tradeoff between performance and timing of attack detection, this optimization may be optional in some embodiments, depending on policies of the operating system, applications, etc.

In an embodiment, if the optimization switch is turned off (or not present), stack inspection may be performed in block 434. If the optimization switch is turned on in block 432, a threat level for an ROP attack is checked to determine whether it is higher than a threshold (e.g., pre-determined threshold) in block 436. If the threat level is determined to be higher than a threshold level in block 436, then stack inspection may be performed in block 434, and the attack may be contained in block 440. If the threat level is determined to be lower than a threshold level in block 436, then stack inspection may be skipped in block 438.

In block 436, an estimation of an ROP attack threat level may be performed for comparison against a threshold level based on CPU hardware level information according to an embodiment of the present principles. For example, modern CPUs may include a prediction mechanism of function returns to improve the efficiency of program execution. To predict the return address, the CPU may maintain a hardware stack within the CPU having a limited size (e.g., "Return Stack Buffer"). In normal execution of a program, this information is used because returns will mostly match the calls. However, when an ROP attack happens, it will violate the pairs of calls and returns, and may therefore cause high mispredictions of returns.

In an embodiment, the number of mispredictions can be measured efficiently using a hardware performance counter (e.g., BPU_MISSED_CALL_RET). By measuring the misprediction rate of this counter, the likelihood of ROP attacks may be estimated. Whether an ROP threat level is above a threshold level may be determined in block 436 based on whether this estimation is higher or lower than a threshold defined for a particular program according to the present principles.

Figure 5:
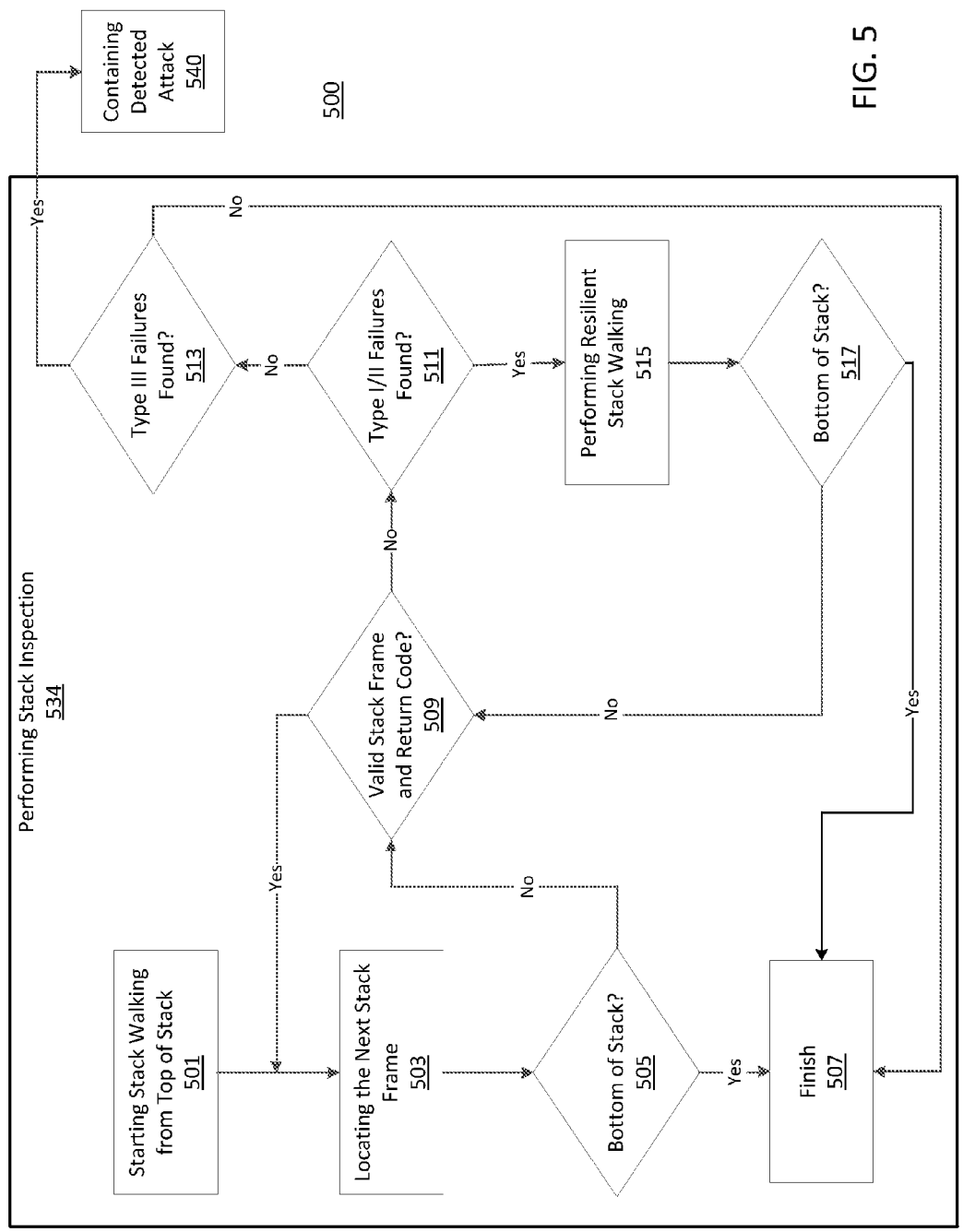
FIG. 5 shows a block/flow diagram of an exemplary method for stack inspection for Return-Oriented-Programming (ROP) attack detection, in accordance with an embodiment of the present principles.

Referring now to FIG. 5, a block/flow diagram of an exemplary method for stack inspection for Return-Oriented-Programming (ROP) attack detection 500 is illustratively depicted in accordance with an embodiment of the present principles. In block 534, stack inspection may be performed to detect ROP attacks. In an embodiment, stack walking may begin from the top of a stack in block 501, and the next frame in a stack may be located in block 503 by employing, for example, unwinding information from a program binary. If a stack pointer points to the bottom of the stack (e.g., stack walking reached bottom of stack) in block 505, then the stack inspection may finish in block 507. If the stack pointer is not pointing to the bottom of the stack in block 505, then it may be determined whether a valid stack frame and/or return code (e.g., return address) is found from the stack frame in block 509.

In an embodiment, if a valid stack frame and return code is found in block 509, then the stack inspection may proceed to locate a next stack frame in block 503. If no valid stack frame and return code is found in block 509, then the present principles may be employed to determine which type of failure(s) may be present according to various embodiments.

In an embodiment, stack walking may return failure conditions for a plurality of reasons, which may be categorized for illustrative purposes into three types of failure cases. For example, if a dynamically generated code is executed, stack walking methods may not be able to find the stack frame (e.g., due to missing unwinding information). Virtual machines, interpreters, emulators, etc., may use this type of code. Such a failure case may be characterized by the code return address in the data section of memory with the executable permission, and the stack pointer belongs to a valid stack memory section. For ease of illustration, these types of failure cases may be referred to as Type I failures.

In an embodiment, a next type of failure (referred to as Type II) may be caused by particular code in an application which does not have proper unwinding information while most of other code in the application has proper unwinding information. In this case, the code return address may be in the code memory section with the executable permission and there may be a corresponding binary file for the code. The stack pointer belongs to a valid stack memory section. The third type of failures (referred to as Type III) may be characterized by an invalid stack pointer or invalid code address. Specifically this condition is determined if the code return address does not belong to any memory sections, or the code address belongs to an unexecutable memory section, or the stack pointer does not belong to a valid stack memory section. This is a common characteristic of inconsistent runtime status of a program counter and a stack which is caused by ROP attacks, and as such, may be an indication of the presence of an ROP attack.

In an embodiment, when a failure is detected in block 509 (e.g., No valid stack frame and return code), the failure may first be checked to determine whether it is a Type I or Type II failure in block 511. If it is determined to be either a Type I or Type II failure in block 511, then resilient stack walking may be performed in block 515. Resilient stack walking may scan a stack for a valid stack frame (e.g., in a brute force manner) while avoiding a Type III failure. In block 517, if the resilient stack walking in block 515 is determined to have reached the bottom of the stack, then the stack inspection may stop, and may finish in block 507. If the bottom of the stack is determined to not have been reached in block 517, it is checked whether a valid stack frame and return code are present in block 509.

In an embodiment, if no Type I or Type II failures are found in block 511, then it is determined whether a Type III failure is present in block 513. If a Type III failure is detected, then the attack may be contained in block 540. If no Type III failure is present, then the stack inspection may finish in block 507. In some embodiments, if there is no Type I or Type II failure detected in block 511, then the failure is automatically determined to be a type III failure in block 513.

Figure 6:
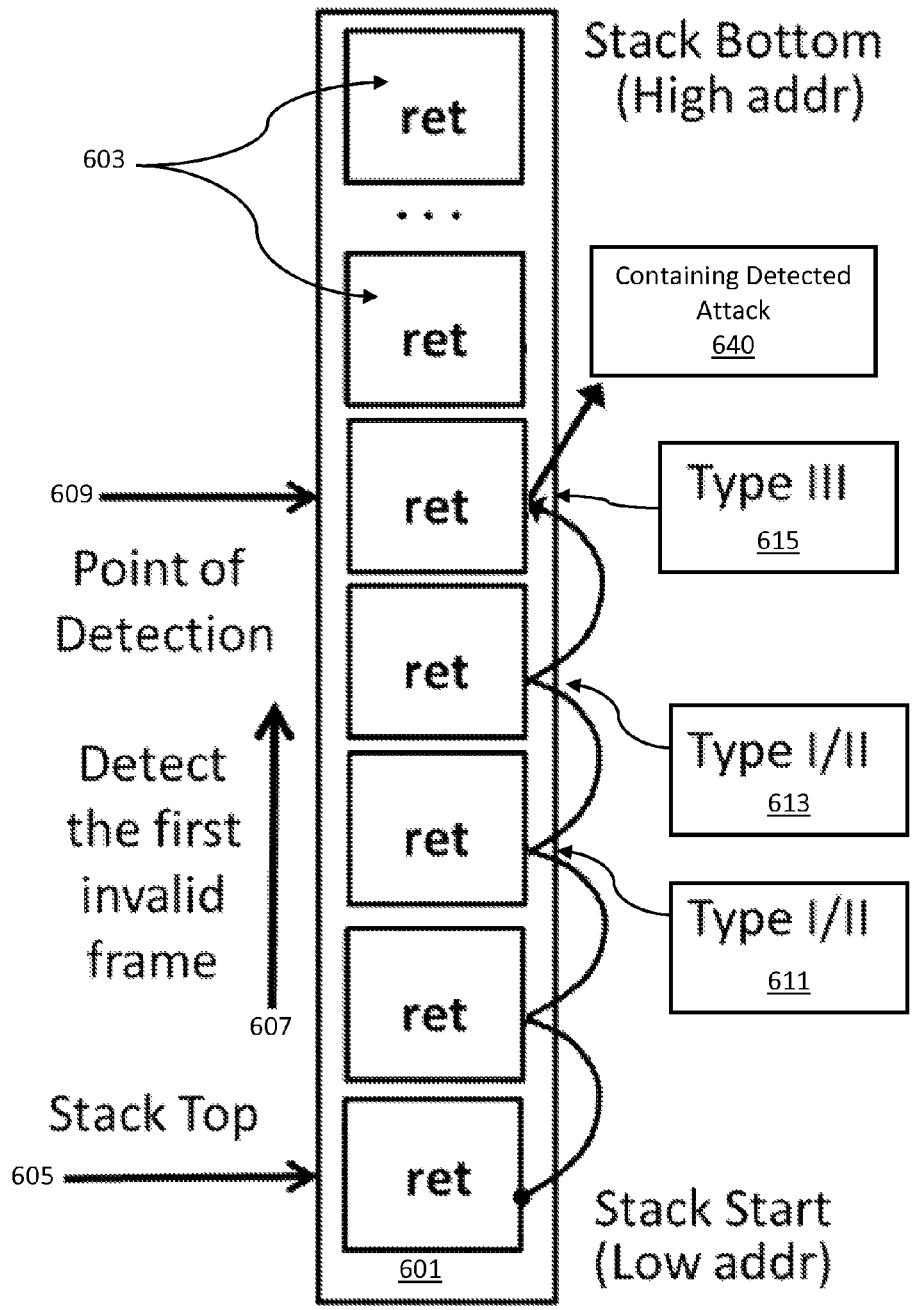
FIG. 6 shows an exemplary method of stack walking for Return-Oriented-Programming (ROP) attack detection, in accordance with an embodiment of the present principles.

Referring now to FIG. 6, an exemplary method of stack walking for Return-Oriented-Programming (ROP) attack detection 600 is illustratively depicted in accordance with an embodiment of the present principles. In an embodiment, the present principles may be employed to scan a stack 601 upwards, beginning at the stack top 605, until the bottom of the stack 617 is reached. In an embodiment, frames 603 are scanned in succession from the stack top to detect a first invalid frame 607. In blocks 611 and 614, Type I and/or Type II failures may be detected (and scanned through without stopping), but when a Type III failure is detected in block 615 at the point of detection (POD) 609, the detected attack may be contained in block 640.

In an embodiment, the containing of an attack may be performed by a containment device in block 640. The containment of the suspicious process found (e.g., ROP attack) is performed in block 640 to avoid any progress of the attack and block the impact inside a computing system.

The attack containment in block 640 may perform two tasks according to an embodiment. First, it may suspend the execution of the found process. Second, it may store the execution status information (e.g., all registers, stack, and heap memory for an offline analysis) in a storage device to determine the details of the attack using an attack analysis device (described in detail below with reference to FIG. 7). In addition, the pair of a program counter and the stack pointer at the point when the type III is detected may be stored in a storage device. This execution status information may be referred to as a point of detection (POD) and it may be the starting point for analyzing the attack using an attack analysis device (described in detail below with reference to FIG. 7).

Figure 7:
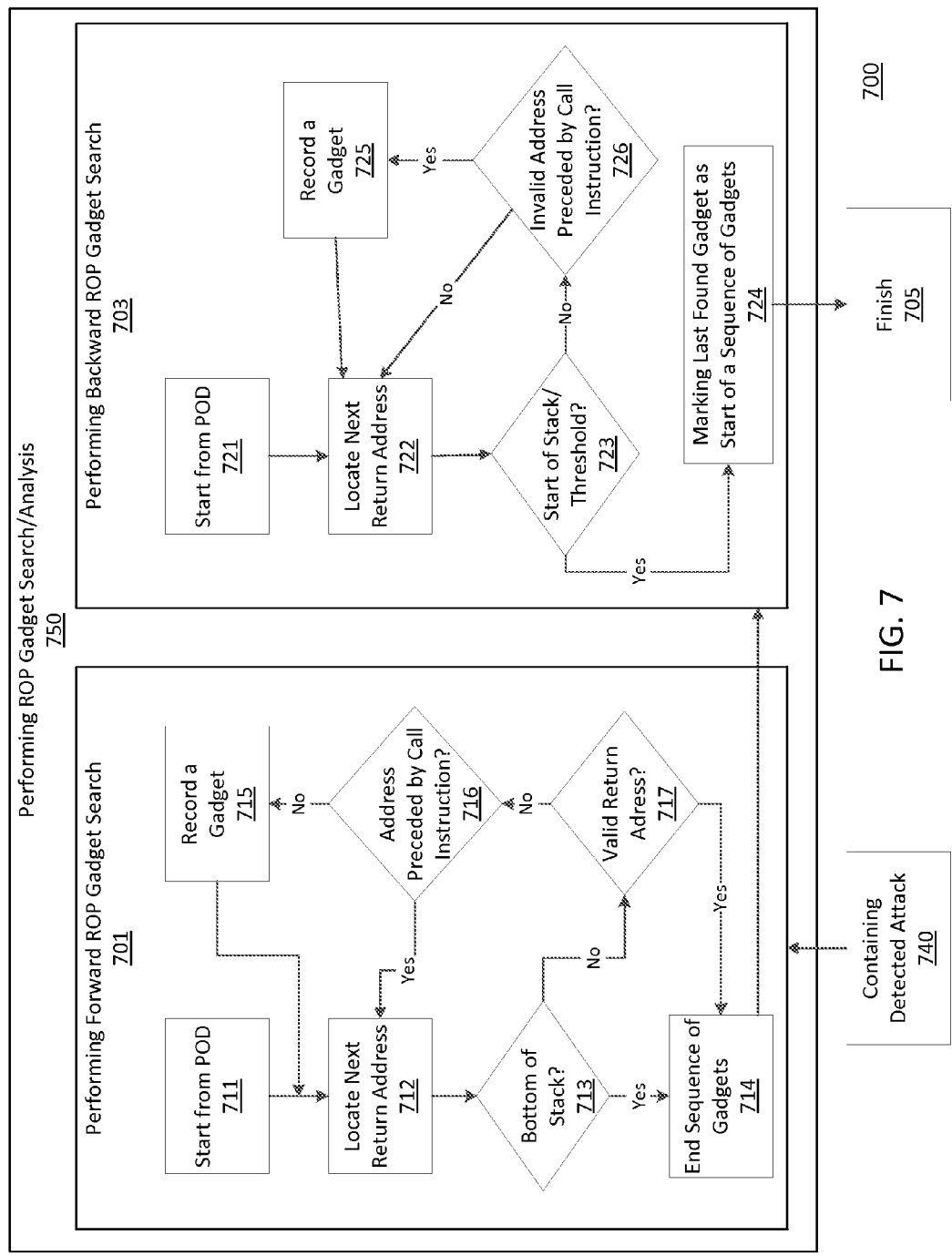
FIG. 7 shows a block/flow diagram of an exemplary method for Return-Oriented-Programming (ROP) gadget analysis, in accordance with an embodiment of the present principles.

Referring now to FIG. 7, with continued reference to FIGS. 4 and 5, a block/flow diagram of an exemplary method for Return-Oriented-Programming (ROP) gadget search and analysis 700 is illustratively depicted in accordance with an embodiment of the present principles. In block 750, ROP gadget analysis may be performed using an attack analysis device according to an embodiment. The gadget analysis in block 750 may determine details of an attack (e.g., ROP attack) from the stored runtime status of a suspicious process. In an ROP attack, the attacker may places a series of chained return addresses which point to the portions of legitimate code (e.g. ROP gadgets). Such a series of code (e.g., ROP gadget) may perform a malicious logic (e.g., malicious program function) which is not intended in the original program. In an embodiment, the gadget search and analysis 750 may automatically find a sequence of ROP gadgets by scanning the stack starting from the POD to perform both forward ROP gadget search and/or analysis in block 701 and backward ROP gadget search and/or analysis in block 703 according to the present principles.

In an embodiment, a forward ROP gadget search 701 may begin the search of the stack from the POD in block 711. The POD may have been detected in block 430 by an attack detector device, and contained in a storage device during attack containment in block 740. The present principles may be employed to advance the stack pointer by the size of the stack pointer towards the bottom of the stack, and may apply a stack walking method similar to the stack walking performed in block 501 as a subroutine to find the next return address in the stack in block 712. If the bottom of stack is reached in block 713, the last ROP gadget obtained may be marked as the end of the ROP gadget sequence in block 714, and the forward ROP gadget search 701 may stop.

In an embodiment, if the bottom of the stack has not been reached, the forward ROP gadget search may determine whether the stack walking method returns a valid return address in block 717. If an invalid return address (e.g., code address) is returned in block 717, it is determined whether the invalid address is preceded by a call instruction in block 716. For example, in a benign program control flow, this is the value pushed by the call instruction, and a call instruction should precede it. However, in ROP, this address generally points to the entry of a ROP gadget which is not necessarily preceded by a call. If this condition fails (e.g., address not preceded by a valid call instruction), the return code address is recorded as an ROP gadget in block 715, and a next return address may be located in block 712. If the address is preceded by a valid call instruction, then the forward ROP gadget search may locate a next return address in block 712 without recording any ROP gadgets according to the present principles.

In an embodiment, if some ROP gadgets have already been executed at detection time, a POD may point to a first ROP gadget that has not yet been executed. In such cases, after the forward ROP gadget search 701 has searched and/or analyzed the partial sequence of ROP gadgets that have not yet been executed, a backward ROP gadget search 703 may be performed to search and/or analyze ROP gadgets that have already been executed according to an embodiment of the present principles.

In an embodiment, a backward ROP gadget search 703 may begin from a POD in block 721, and the search may advance by the size of a stack pointer towards the start of a stack to locate a next return address and/or find an instruction that may be an ROP gadget in block 722. This may continue until a start of the stack, or a stack location determined by a threshold condition (e.g., pre-determined threshold level) in block 723. If the start of the stack (or a threshold condition) has been determined to have been reached in block 723, the last found ROP gadget may be marked as the start of an ROP gadget sequence in block 724, and the backward ROP gadget search 703 may finish in block 705.

In an embodiment, if the start of the stack (or a threshold condition) has been determined to not have been reached in block 723, the search may determine whether the stack walking subroutine has returned an invalid address, and whether the invalid address is preceded by a call instruction in block 726. If an invalid address is found, and is not preceded by a call instruction in block 726, then the return code address may be recorded as an ROP gadget in block 725, and a next return address may be located in block 722. If the address is determined to be valid, and preceded by a valid call instruction in block 726, then the backward ROP gadget search may locate a next return address in block 722 without recording any ROP gadgets according to an embodiment of the present principles.

Referring now to FIG. 8, with continued reference to FIGS. 4, 5, and 7, a block/flow diagram of an exemplary system for detection, extraction, and prevention of Return-Oriented-Programming (ROP) attacks 800 is illustratively depicted in accordance with an embodiment of the present principles. While many aspects of system 800 are described in singular form for the sakes of illustration and clarity, the same can be applied to multiples ones of the items mentioned with respect to the description of system 800. For example, while a single ROP attack may be mentioned with respect to the attack detector 803, more than one ROP attack may be detected by more than one attack detector 803 in accordance with the teachings of the present principles, while maintaining the spirit of the present principles. Moreover, it is appreciated that the attack detector 803 is but one aspect involved with system 800 than can be extended to plural form while maintaining the spirit of the present principles.

The system 800 can include one or more attack detectors 803, one or more containment devices 805, one or more attack analysis devices 807, one or more stack inspection devices 809, one or more optimization switches 811, one or more stack walking devices 813, one or more address validity determination devices 815, and one or more storage devices 817, which may be connected to a bus 801 according to various embodiments of the present principles.

In an embodiment, one or more attack detectors 803 may be employed to detect ROP attacks (e.g., in block 430) according to the present principles, and may be employed to determine whether an ROP threat is above or below a threshold level (e.g., in block 436). One or more containment devices 805 may be employed to contain ROP attacks (e.g., in block 440) to prevent any progress of the attack and block any attack impact (e.g., within a computing system, application, etc.), and ROP attack information may be stored in a storage device 817. An attack search and analysis device 807 may perform ROP gadget search and analysis (e.g., in block 750). The attack search and analysis device 807 may perform a forward ROP gadget search (e.g., in block 701) and/or a backward ROP gadget search (e.g., in block 703) according to various embodiments of the present principles.

In an embodiment, a stack inspection device 809 may be employed to inspect one or more stacks (e.g., in block 534) to detect ROP attacks, and to determine failure types (e.g., Type I, II, and/or III). An optimization switch 811 may be employed (e.g., in block 432) to lower overhead cost and increase speed, and may be dependent on the hardware of the system to which the present principles may be applied. In an embodiment, a stack walking device 813 may be employed to perform stack walking and/or resilient stack walking (e.g., in blocks 501 and 515, respectively), and an address validity determination device 815 may determine whether a valid stack frame and/or return address is found (e.g., in block 509) according to various embodiments of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for detection and prevention of Return-Oriented-Programming (ROP) attacks in one or more applications, comprising:
   iteratively performing stack inspection of all stack frames in a stack, using a stack inspection device, to detect all ROP gadgets in the stack, the stack inspection further comprising:
     stack walking from a stack frame at a top of the stack toward a bottom of the stack to detect one or more failure conditions;
     determining whether a valid stack frame and return code address is present;
     determining a failure condition type if no valid stack frame and return code is present, wherein Type III failure conditions indicate an ROP attack; and
     determining whether an ROP threat level is higher than a threshold level;
   containing all of the ROP attacks using a containment device, the ROP attacks being prevented by containing each of the ROP gadgets before execution of the ROP gadgets and before execution of a first OS event from any of the ROP gadgets; and
   analyzing, using an attack analysis device, each of the ROP gadgets detected in the stack during the ROP attacks, the analyzing including performing an offline systemic forensic analysis by automatically extracting attack sequences of all of the ROP gadgets injected into the stack.

2. The method as recited in claim 1, wherein the ROP threat level is determined by measuring a misprediction rate of pairs of calls and returns in the stack using a hardware performance counter.

3. The method as recited in claim 1, wherein the containing of the ROP attacks further comprises:
   suspending execution of all applications which include detected ROP gadgets; and
   storing execution status information in a storage device, the execution status information including at least one of registers, stack, and heap memory for analysis using the attack analysis device.

4. The method as recited in claim 1, wherein the analyzing of the ROP gadgets further comprises:
   performing a forward ROP gadget search to locate and analyze ROP gadgets that have not been executed; and
   performing a backward ROP gadget search to locate and analyze ROP gadgets that have already been executed.

5. The method as recited in claim 4, wherein the forward ROP gadget search iteratively repeats until the bottom of the stack is reached, and the backward ROP gadget search iteratively repeats until a start of the stack is reached.

6. The method as recited in claim 4, wherein the backward ROP gadget search iteratively repeats until a stack location determined by a threshold level is reached.

7. The method as recited in claim 1, wherein the failure condition types include Type I, Type II, and Type III failure conditions.

8. A system for detection and prevention of Return-Oriented-Programming (ROP) attacks in one or more applications, comprising:
   an attack detection device, including a stack inspection device configured to iteratively perform stack inspection of all stack frames in a stack to detect all ROP gadgets in the stack, the stack inspection device further comprising:
     a stack walking device for stack walking from a stack frame at a top of the stack toward a bottom of the stack to detect one or more failure conditions; and
     an address validity determination device for determining whether a valid stack frame and return code address is present and determining a failure condition type, wherein Type III failure conditions indicate an ROP attack, wherein the stack inspection device
   determines whether an ROP threat level is higher than a threshold level;
   a containment device configured to contain all of the ROP attacks, the ROP attacks being prevented by containing each of the ROP gadgets before execution of the ROP gadgets and before execution of a first OS event from any of the ROP gadgets; and
   an attack analysis device for analyzing each of the ROP gadgets detected in the stack during the ROP attack, the analyzing including performing an offline systemic forensic analysis by automatically extracting attack sequences of all of the ROP gadgets injected into the stack.

9. The system as recited in claim 8, wherein the ROP threat level is determined by measuring a misprediction rate of pairs of calls and returns in the stack using a hardware performance counter.

10. The system as recited in claim 8, wherein the containment device contains the ROP attacks by suspending execution of all applications which include detected ROP gadgets, and storing execution status information in a storage device, the execution status information including at least one of registers, stack, and heap memory for analysis using the attack analysis device.

11. The system as recited in claim 8, wherein the attack analysis device analyzes the ROP gadgets by performing a forward ROP gadget search to locate and analyze ROP gadgets that have not been executed, and performing a backward ROP gadget search to locate and analyze ROP gadgets that have already been executed.

12. The system as recited in claim 11, wherein the forward ROP gadget search iteratively repeats until the bottom of the stack is reached, and the backward ROP gadget search iteratively repeats until a start of the stack is reached.

13. The system as recited in claim 11, wherein the backward ROP gadget search iteratively repeats until a stack location determined by a threshold level is reached.

14. The system as recited in claim 8, wherein the failure condition types include Type I, Type II, and Type III failure conditions.

15. A non-transitory computer-readable storage medium comprising a computer-readable program, wherein the computer-readable program when executed on a computer causes the computer to perform the steps of:
  iteratively performing stack inspection of all stack frames in a stack, using a stack inspection device, to detect all ROP gadgets in the stack, the stack inspection further comprising:
    stack walking from a stack frame at a top of the stack toward a bottom of the stack to detect one or more failure conditions;
    determining whether a valid stack frame and return code address is present;
    determining a failure condition type if no valid stack frame and return code is present, wherein Type III failure conditions indicate an ROP attack; and
    determining whether an ROP threat level is higher than a threshold level;
  containing all of the ROP attacks using a containment device, the ROP attacks being prevented by containing each of the ROP gadgets before execution of the ROP gadgets and before execution of a first OS event from any of the ROP gadgets; and
  analyzing, using an attack analysis device, each of the ROP gadgets detected in the stack during the ROP attack, the analyzing including performing an offline systemic forensic analysis by automatically extracting attack sequences of all of the ROP gadgets injected into the stack.

16. The computer-readable storage medium of claim 15, wherein the containing of the ROP attacks further comprises:
  suspending execution of all applications which include detected ROP gadgets; and
  storing execution status information in a storage device, the execution status information including at least one of registers, stack, and heap memory for analysis using the attack analysis device.

* * * * *